(12) United States Patent
Massiere et al.

(10) Patent No.: US 9,741,069 B2
(45) Date of Patent: Aug. 22, 2017

(54) METHOD OF USING A USER DEVICE FOR REMOTE PAYMENT OF A SHOPPING BASKET ON A MERCHANT SERVER, AND AN ASSOCIATED SYSTEM

(75) Inventors: Olivier Massiere, Paris (FR); Thibaut Roussel, Issy les Moulineaux (FR); Pierre Francois Dubois, Sceaux (FR); Olivier Gruson, Fontaine-Etoupefour (FR)

(73) Assignee: ORANGE, Paris (FR)

(*) Notice: Subject to any disclaimer, the term of this patent is extended or adjusted under 35 U.S.C. 154(b) by 36 days.

(21) Appl. No.: 14/122,138

(22) PCT Filed: May 24, 2012

(86) PCT No.: PCT/FR2012/051171
§ 371 (c)(1),
(2), (4) Date: Apr. 21, 2014

(87) PCT Pub. No.: WO2012/160318
PCT Pub. Date: Nov. 29, 2012

(65) Prior Publication Data
US 2014/0229339 A1 Aug. 14, 2014

(30) Foreign Application Priority Data
May 25, 2011 (FR) .................... 11 54551

(51) Int. Cl.
*G06Q 30/06* (2012.01)
*G06Q 20/32* (2012.01)
(Continued)

(52) U.S. Cl.
CPC ......... *G06Q 30/0635* (2013.01); *G06Q 20/12* (2013.01); *G06Q 20/3229* (2013.01);
(Continued)

(58) Field of Classification Search
CPC ............ G06Q 30/0635; G06Q 30/0633; H04L 63/00; H04L 9/00; H04L 9/08
(Continued)

(56) References Cited

U.S. PATENT DOCUMENTS

| 7,908,216 B1* | 3/2011 | Davis ..................... G06Q 20/02 705/41 |
| 2002/0002515 A1* | 1/2002 | Okazaki ............. G06Q 30/0621 705/26.5 |

(Continued)

FOREIGN PATENT DOCUMENTS

WO  2011/056156 A1  5/2011

OTHER PUBLICATIONS

International Preliminary Report on Patentability and Written Opinion dated Oct. 28, 2013 for corresponding International Patent Application No. PCT/FR2012/051171, filed May 24, 2012, 12 pages.
International Search Report and Written Opinion dated Aug. 21, 2012 for corresponding International Application No. PCT/FR2012/051171, filed May 24, 2012.

*Primary Examiner* — Yogesh C Garg
*Assistant Examiner* — Lalith Duraisamygurusamy
(74) *Attorney, Agent, or Firm* — David D. Brush; Westman, Champlin & Koehler, P.A.

(57) ABSTRACT

A user device configured to connect to a mobile telephony network and associated with an identification number in the mobile telephony network. The user device selects a method of paying for the shopping basket on a first page of the merchant server; upon selection, the user device sends a payment request to a payment validation module, which is enriched with identification data of the user device; the user device receives a local authentication request message from the payment validation module over the mobile telephony network; on receiving the local authentication request message, the user device triggers execution of an operation of
(Continued)

locally authenticating a user of the user device; the user device sends a local authentication response message to the payment validation module; and the user device is redirected by the payment validation module to a second page of the merchant server giving the result of the payment transaction.

11 Claims, 3 Drawing Sheets

(51) Int. Cl.
- *G06Q 20/40* (2012.01)
- *G07F 7/10* (2006.01)
- *G06Q 20/12* (2012.01)
- *H04L 29/06* (2006.01)
- *H04L 9/08* (2006.01)
- *H04L 9/00* (2006.01)

(52) U.S. Cl.
CPC ......... *G06Q 20/40* (2013.01); *G06Q 20/4012* (2013.01); *G07F 7/1058* (2013.01); *H04L 9/00* (2013.01); *H04L 9/08* (2013.01); *H04L 63/00* (2013.01)

(58) Field of Classification Search
USPC ................................................ 705/26.8–27.2
See application file for complete search history.

(56) References Cited

U.S. PATENT DOCUMENTS

| | | | |
|---|---|---|---|
| 2004/0019564 A1* | 1/2004 | Goldthwaite | G06Q 20/04 705/44 |
| 2004/0049454 A1* | 3/2004 | Kanno | G06Q 20/06 705/39 |
| 2007/0206753 A1* | 9/2007 | Chang | H04L 29/06027 379/201.01 |
| 2008/0201266 A1* | 8/2008 | Chua | G06Q 20/12 705/67 |
| 2008/0235084 A1* | 9/2008 | Quoc | G06Q 30/0242 705/14.41 |
| 2010/0058056 A1* | 3/2010 | Wang | G06F 21/79 713/168 |
| 2010/0235749 A1* | 9/2010 | Ratnakar | G06Q 30/02 715/733 |
| 2011/0189981 A1* | 8/2011 | Faith | G06F 1/1694 455/414.1 |
| 2011/0319061 A1* | 12/2011 | Schmackpfeffer | H04L 12/587 455/415 |
| 2012/0158581 A1* | 6/2012 | Cooley | G06Q 20/102 705/40 |
| 2013/0283400 A1* | 10/2013 | Schneider | G06F 21/572 726/30 |

\* cited by examiner

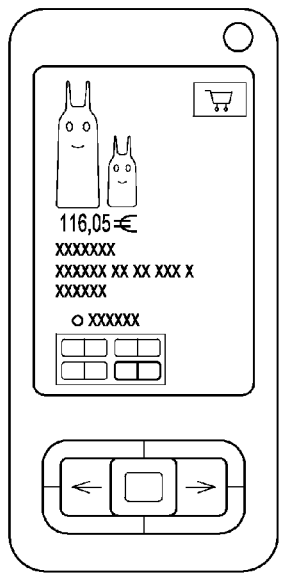
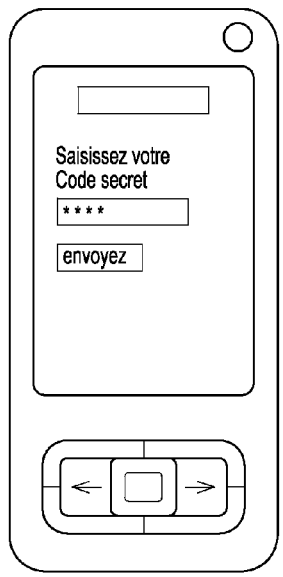
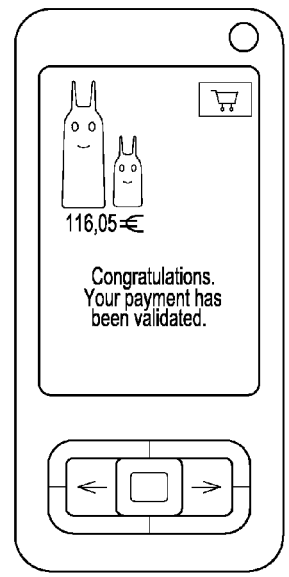
Fig. 3A          Fig. 3B          Fig. 3C
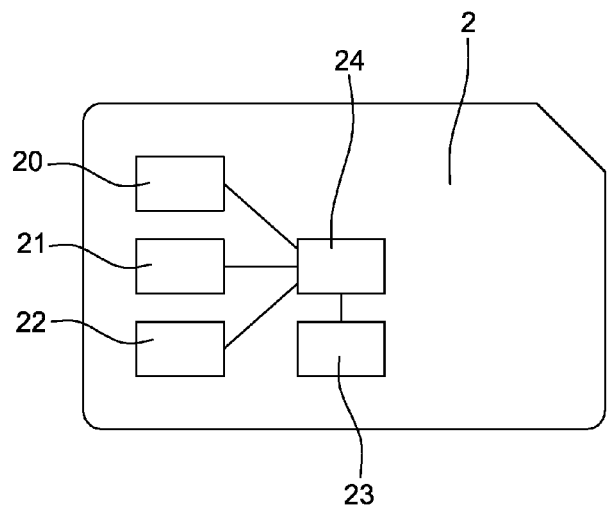
Fig. 4

METHOD OF USING A USER DEVICE FOR REMOTE PAYMENT OF A SHOPPING BASKET ON A MERCHANT SERVER, AND AN ASSOCIATED SYSTEM

CROSS-REFERENCE TO RELATED APPLICATIONS

This application is a Section 371 National Stage application of International Application No. PCT/FR2012/051171, filed May 24, 2012, which is incorporated by reference in its entirety and published as WO 2012/160318 on Nov. 29, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present invention lies in the field of on-line payment, and more particularly in the field of on-line payment from a user device connected to a mobile telephony network.

BACKGROUND OF THE DISCLOSURE

There are three main techniques for on-line payment from a mobile user device:
- payment using a bank card, requiring the terminal to be used, on each transaction, to input bank details (card number, expiry date, and pictogram code) for use by a web site or by a mobile application;
- payment using an account previously opened with a merchant site or a payment site such as PAYPAL™, ITUNES™, or AMAZON PAYMENTS™, etc., site, that requires bank details, generally bank card details, to be communicated with the merchant or payment site while opening the account, with payment being performed by means of a log-in system and a password that needs to be input on each transaction; and
- payment on the bill of a mobile operator, implemented by direct debit on the client's mobile bill from the mobile operator.

Of those three main techniques, the payment using the mobile bill is particularly appreciated by users because it is simple to use.

That technique of payment by mobile bill operates using a mobile terminal, e.g. a terminal of the "smartphone" type, that is connected to a mobile network. The mobile terminal needs to have a web browser and must previously be registered with a mobile bill payment service of the mobile operator.

Payment for a shopping basket on a merchant web site using a user mobile terminal and using the mobile bill payment technique takes place as follows:

The user uses the mobile terminal to navigate to the merchant site, to prepare a shopping basket containing one or more goods to be purchased, and then clicks on an element of the web page to select the mobile bill method of payment, generally from a plurality of methods of payment made available on the merchant site. After selecting mobile bill payment, the browser of the mobile terminal is redirected by the merchant site to a page of a payment web site.

On being redirected, the mobile terminal sends a request to the payment site, which request contains a payment authorization request containing transaction data (amount, date/time, and transaction identifier). On being transmitted over the mobile network, the payment authorization request is enriched by a platform in the mobile network with the identification data of the mobile terminal, typically the mobile station integrated services digital network (MSISDN) number of the terminal. The MSISDN number or mobile station ISDN number is the publicly known number identifying the mobile telephone in the mobile network. It is this identifier, commonly called the "telephone number", that needs to be dialed in order to reach the subscriber.

In response to the request, the payment site sends a payment confirmation web page to the terminal, with the terminal displaying the page that contains the transaction data and that invites the user to confirm payment by means of a click (e.g. by clicking on a "confirm" button of the web page). The payment confirmation click triggers execution of the payment transaction. The payment site then transmits the payment authorization request containing the transaction data and the MSISDN number of the mobile terminal to a platform/entity of the mobile operator. On receiving the payment authorization request, the platform of the mobile operator identifies the mobile terminal on the basis of the received MSISDN number, and then verifies that it is registered with the mobile bill payment service and that the amount of the transaction can be authorized. When verification is positive, the platform of the mobile operator responds to the payment site by sending a payment authorization message. The payment site informs the merchant site that the payment transaction has proceeded and uses the mobile network to send a payment confirmation SMS message to the MSISDN number of the mobile terminal, which message indicates that the requested payment has been authorized.

Users appreciate the steps they need to perform when making a payment by means of a mobile bill because they are simple to use. The payment requires only two simple clicks on the part of the user: a first click on the merchant web site and a second click on the payment web site.

The security of such a payment technique relies on the mobile terminal and on the assumption that the user of the mobile terminal has previously activated a security SIM card of the terminal by means of a PIN code for unblocking and possibly unlocking the terminal with the help of an additional unlocking code. Nevertheless, such security is relatively limited. When the SIM card is unblocked and the mobile terminal unlocked, any person other than the owner of the terminal can use the terminal to pay for purchases on the merchant site by using the mobile bill method of payment. As a result, that mobile bill method of payment is generally used only for micropayments, i.e. for payments of small amounts that do not exceed a maximum, which at present is of the order of a few tens of euros.

There therefore exists a need for a technique for on-line payment from a terminal connected to a mobile telephony network that is both simple to use and that presents a higher level of security so as to make it possible to make payments for larger amounts.

SUMMARY

To this end, the invention provides a method of using a user device for remote payment of a shopping basket on a merchant server, said user device being suitable for connecting to a mobile telephony network and being associated with an identification number in said mobile telephony network, wherein:

a) the user device selects a method of paying for the shopping basket on a first page of the merchant server;

b) on the method of payment being selected, the user device sends a payment request to a payment validation module, said request being automatically enriched with identification data of the user device from which it is possible to determine the identification number of said user device in the mobile telephony network;

c) the user device receives a local authentication request message from the payment validation module that is sent over the mobile telephony network to the identification number of the device in the mobile telephony network;

d) on receiving the local authentication request message, the user device automatically triggers execution of an operation of locally authenticating a user of the user device;

e) the user device sends a local authentication response message to the payment validation module; and f) the user device is redirected by the payment validation module to a second page of the merchant server giving the result of the payment transaction.

In the invention, selecting the method of payment on the first page of the merchant server, which is done for example by means of a single click, triggers in the user device:

firstly local authentication of the user; and then a transfer of the user device to a second page of the merchant server, which page indicates the result of the payment transaction (success or failure).

Thus, from the user point of view, payment comprises the following three steps:

selecting the method of payment on a first page of the merchant server;

local authentication; and discovering the result of the payment transaction on a second page of the merchant server.

The payment process is partially transparent from the user point of view: all along the payment process, the user device displays only pages from the merchant server, without being redirected to a page of the payment validation module, and the user performs local authentication at device level.

The local authentication not only imparts a higher level of security to the payment, but it also makes it possible to obtain confirmation of the payment from the user. It thus performs two roles, both confirming the payment and securing the payment. In this way, the payment process appears very simple to the user.

The payment method is thus simultaneously simple, fast, and very secure. The combination of an automatic identification of the user device in the mobile network, without any need for the user to input the mobile identification number, together with local authentication triggered by that identification in the mobile network, makes it possible for the user to experience a payment process that is both simple and secure.

In a first particular implementation, said identification data of the user device is added to the payment request sent by the user device by means of an entity in the mobile telephony network. Under such circumstances, it is an entity in the mobile network, typically a platform of the mobile operator located in series with the data streams transmitted by the user device and having knowledge of the connected user device, that inserts the identification data of the user device in the payment request.

Under such circumstances, the user device may comprise a mobile terminal and a security module associated with said mobile terminal, and it is said mobile terminal and said security module that perform steps a) to f).

In this first implementation, the user performs the entire payment process on the mobile terminal and it is a platform in the mobile network that supplies the identification data of the mobile terminal to the payment validation module.

In a second implementation, the identification data of the user device is provided by the merchant server together with the first page and is then automatically inserted by the user device in the payment request that is sent to the payment validation module.

Under such circumstances, the user device may comprise a first terminal, which is a browser terminal, a second terminal, which is a mobile terminal, and a security module associated with the mobile terminal, the browser terminal performing steps a), b), and f), and the mobile terminal with the associated security module performing the steps c), d), and e).

In the second implementation, the payment process experienced by the user takes place on two terminals: a navigation terminal and a mobile telephony terminal. From the user point of view, the payment process comprises selecting the method of payment on a first page of the merchant server and discovering the result of the payment transaction on a second page of the merchant server, both of which operations are performed using the navigator terminal. The user makes use of the mobile terminal only for performing local authentication between the displays of the first and second pages of the merchant server. The payment process experienced by the user thus remains very simple.

The invention also provides a system for remote payment of a shopping basket, the system comprising:

a user device suitable for being connected to a mobile telephony network and associated with an identification number in said mobile telephony network;

a merchant server; and a payment validation module;

which device, server, and module are adapted to perform the steps of the method as defined above.

BRIEF DESCRIPTION OF THE DRAWINGS

There follows a description of a particular implementation of the remote payment method of the invention used from a user device, and of the system suitable for implementing the method, the description being given with reference to the accompanying drawings, in which:

FIG. 3 shows successive screen contents of a mobile terminal while a user is in the process of using the first implementation of FIG. 1; and FIG. 4 is a functional block diagram of a security card of the FIG. 1 user device.

DETAILED DESCRIPTION OF ILLUSTRATIVE EMBODIMENTS

Figure 1:
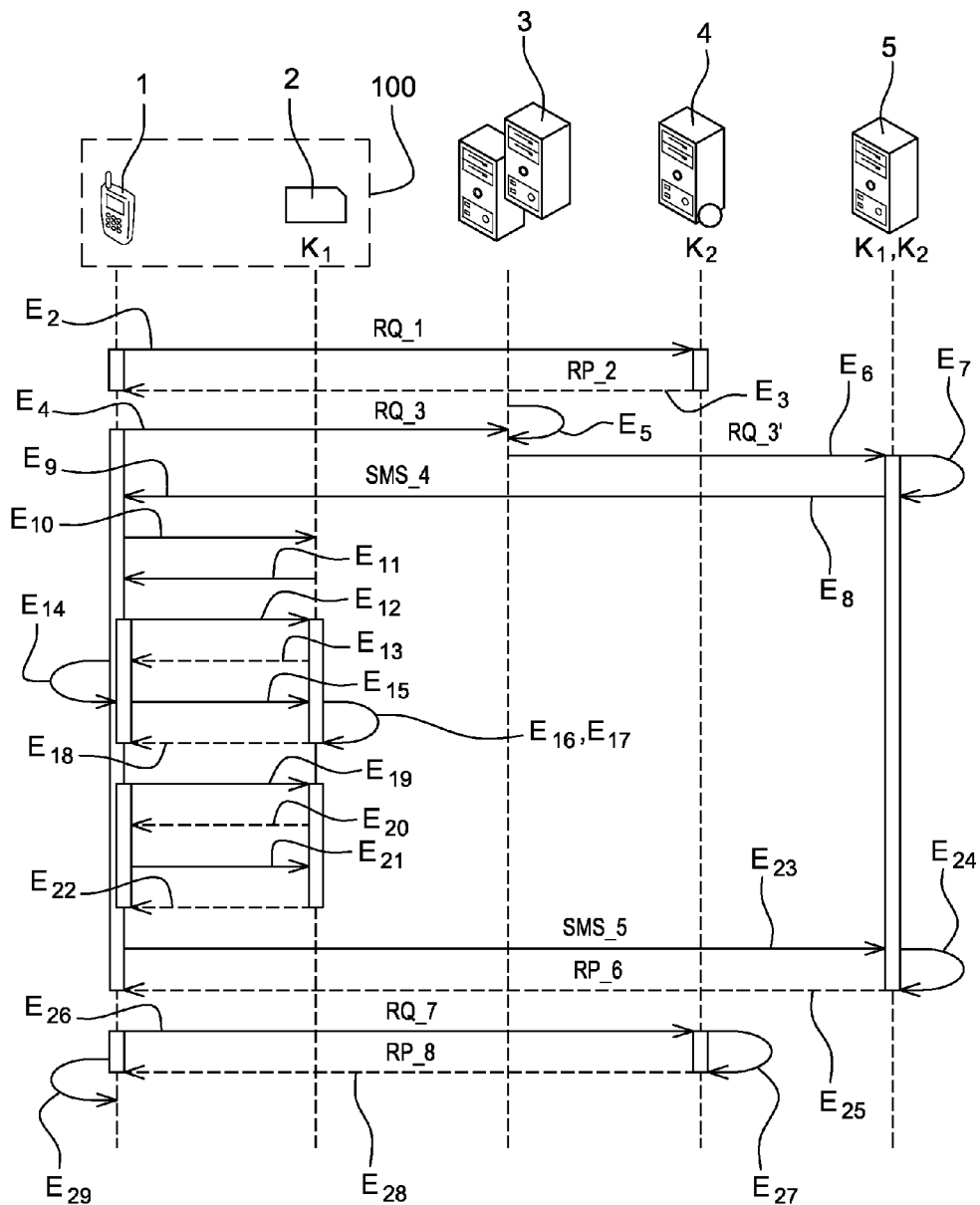
FIG. 1 shows the exchanges undertaken between the various entities of the system while implementing the method in a first particular implementation of the invention.

FIG. 1 shows a succession of steps performed while paying for a basket of purchases from a merchant server 4 by a user device 10 in a system implementing a first implementation of the invention.

The system shown in FIG. 1 comprises the various entities listed below:
- a user device 100;
- an enrichment platform 3 for enriching a mobile communications network:
- a merchant server 4; and
- a payment validation module 5.

The user device 100 comprises a mobile terminal 1 and a security module 2, specifically a SIM card.

In this example, the mobile terminal 1 is a mobile telephone. Nevertheless, it could be any type of mobile terminal suitable for connecting to a mobile telephony network, e.g. an electronic tablet having means for accessing a mobile network. The mobile telephone 1 is suitable for connecting to a mobile telephony network of a mobile network operator. The mobile terminal 1 has an identification number in this mobile telephony network, known specifically as the mobile station integrated services digital network (MSISDN) number. The MSISDN number is the publicly known identification number for the mobile telephone in the mobile network. It is this identifier, commonly referred to as a "telephone number", that is used for calling the mobile terminal or for sending it messages such as SMS or MMS messages.

The mobile terminal 1 has a browser for browsing sites of a computer network, specifically the Internet. The mobile terminal 1 accesses the Internet in this example via the mobile telephony network.

The mobile telephone 1 incorporates the security SIM card 2 which is connected to the telephone 1. This SIM card 2 comprises:
- means 20 for storing security codes, specifically a PIN code for unblocking the card and a service PIN code;
- a first software module 21 for locally authenticating unblocking of the card;
- a second software module 22 for locally authenticating a service;
- an encryption/decryption software module 23; and
- a processor 24 suitable for executing the software modules 21 and 22.

For reasons of clarity, only those elements of the card 2 that are necessary for understanding the invention are described herein.

The enrichment platform 3 is managed by the operator of the mobile telephony network and is located in series in the data streams transmitted by the mobile terminal 1, in particular when it is browsing the Internet.

The merchant server 4 hosts a merchant web site for purchasing goods and/or services.

The role of the payment validation module 5 is to validate a payment when purchasing a shopping basket on the merchant site 4. The term "shopping basket", or "basket", is used herein to designate one or more goods and/or services that a user seeks to purchase from the merchant site 4.

The payment validation module 5 and the SIM card 2 share a key, in this example a symmetrical secret key, written K1. This key K1 is stored by the storage means 20 of the SIM card 2 and in a database of the validation module 5, in association with an account of the user of the device 100 registered with the payment validation module 5.

The merchant server 4 and the payment validation module 5 share a symmetrical secret key K2 that is stored in their respective databases.

With reference to FIG. 1, there follows a description of the steps of the method of paying for a shopping basket on the merchant server 4 from the mobile terminal 1.

During a prior registration step E0 (not shown), a user of the mobile terminal 1 registers payment bank details, e.g. bankcard details, with the payment validation module 5. By way of example, the bank details may be transmitted to the validation module 5 by a secure connection to a web site hosted by the validation module 5, or by using the postal service.

During this registration step E0, the secret key K1 shared between the SIM card 2 and the payment validation module 5 may be generated and registered in the card 2 and the module 5.

During a step E1 (not shown), the mobile terminal 1 browses to the web site of the merchant server 4 and makes up a shopping basket. The shopping basket may contain one or more goods or services that the user of the mobile terminal 1 seeks to purchase from the merchant site.

During a step E2, the mobile terminal 1 sends a request to the merchant server 4, specifically an http GET request, given reference RQ_1 in FIG. 1, requesting a shopping basket and payment means selection page.

During a step E3, in response to the request RQ_1, the merchant server 4 sends an http "200 OK" code response, given reference RP_2, containing the shopping basket web page requested in step E2. This shopping basket web page, as displayed by the mobile terminal 1 on its screen, is shown in FIG. 3A, and it contains:
- transaction data for paying for the shopping basket, comprising the amount, the date and the time of the transaction, and also a transaction identifier allocated by the merchant server 4 to the payment transaction under consideration; and
- elements, specifically icons, for selecting a method of payment, and comprising in particular an icon for enabling the mobile terminal to select a method of payment.

During a step E4, when the user has selected and validated a method of payment by mobile telephone, the mobile telephone 1 transmits an http GET payment request, written RQ_3, to the payment validation module 5, and calls a script for managing validation of the payment. The payment request RQ_3 contains transaction data (amount, date/time, and identifier of the transaction).

The payment request RQ_3 is initially received by the enrichment payment MNO 3 that is located in series in the data streams transmitted by the terminal 1. During a step E5, the platform 3 enriches the request RQ_3 by adding thereto an identification number of the mobile terminal 1 in the mobile network specifically its MSISDN number (Mobile Station Integrated Service Digital Network). Instead of the MSISDN number, the enrichment platform 3 could add other identification data to the request RQ_3, e.g. an identification alias. This identification alias may be generated by the operator of the mobile network of the user device 1, using an alias generating function and based on the MSISDN identification number of the user device 1. The alias as generated in this way is then delivered to the merchant server 4 and to the payment validation module 5. Under such circumstances, the validation module 5 has a calculation module that is adapted to calculate an MSISDN number from an identification alias, using a function that is the inverse of the function for alias generation. In a variant, it is possible to envisage storing the alias in association with the MSISDN number in a database of the validation module 5. In any event, the identification data added to the request RQ_3 is suitable for making it possible, on the basis of this identification data, to determine the identification number of the mobile terminal 1 in the mobile network.

It should be emphasized that the identification data is added to the request RQ_3 in automatic manner, without the user having to input this identification data.

During a step E6, the enrichment platform 3 forwards the enriched request, written RQ_3', to the payment validation module 5.

The validation module 5 receives the enriched request RQ_3', and obtains the MSISDN number of the mobile terminal 1 by extracting it from the request RQ_3'. When the request RQ_3' contains an identification alias, the validation module 5 determines the MSISDN number from the alias.

In a step E7, the payment validation module 5 generates a local authentication request message suitable for being transmitted over the mobile network. In this example, the authentication request message is an SMS command message written SMS_4. It is addressed to the local authentication module 22 hosted in the SIM card 2 of the mobile terminal 1 and it contains a local authentication request and the data relating to the payment transaction (amount, date/time, and identifier of the transaction as delivered by the merchant server 4). The message SMS_4 is encrypted using the secret key K1 shared by the validation module 5 and the SIM card 2. The request message is encrypted in order to enable the card 2 to verify that the authentication request does indeed come from the validation module 5. As an alternative to symmetrical encryption, it is possible to envisage asymmetrical encryption or an authentication signature.

During a step E8, the validation module 5 sends the authentication request message SMS_4 to the MSISDN number of the mobile telephone 1 using an SMS sender server of the mobile operator (not shown).

The local authentication request message SMS_4 is received by the mobile terminal 1 over the mobile network during a step E9.

At this point, it should be observed that the exchanges between the mobile terminal 1 and the SIM card 2 are encrypted by a secret key that is shared or by a pair of keys that are asymmetrical, in known manner.

During a step E10, the mobile terminal 1 sends the message SMS_4 to the SIM card 2 for use by the local authentication module 22. The message SMS_4 is decrypted by the decryption module 23 of the card 2 and the decrypted message SMS_4 is delivered to the local authentication module 22. On receiving the local authentication request that is present in the message SMS_4, the authentication module 22 triggers execution of a local authentication operation as described below.

During a step E11, the card 2 transmits values "SW1 SW2" to the mobile terminal 1 acknowledging that the card 2 has properly received the message SMS_4 and indicating that the local authentication module 22 seeks to send a command to the terminal 1 by means of a proactive command. During a step E12, the mobile terminal 1 transmits a "FETCH" command to the local authentication module 22 of the card 2 in order to obtain the command for sending. In response, during a step E13, the local authentication module 22 of the card 2 transmits a "GET INPUT" command to the terminal 1 that is adapted to cause a window to be displayed on the screen of the terminal 1 for inputting a service PIN code, the window also containing the transaction data, as shown in FIG. 3B.

During a step E14, the user of the mobile terminal 1 inputs the requested service PIN code in the window and then validates the input. During a step E15, the terminal 1 sends a response message containing the service PIN code as input to the local authentication module 22 of the card 2.

During a step E16, the local authentication module 23 verifies the input service PIN code, by comparing it with the code stored in the card 2.

In the event of the service PIN code as input being incorrect, the card 2 sends an error message to the terminal 1 inviting the user to input the service PIN code again. After a predefined number of failures to input the service PIN code, local authentication is locked. The SIM card 2 then generates an SMS message in response to the local authentication request, which message contains the transaction data (amount, date/time, and transaction identifier) together with a "NOK" indication indicating that local authentication has failed. This SMS message is encrypted, specifically using the key K1, and then transmitted to the payment validation module 5 via the terminal 1 (as described below for the message SMS_5).

When the service PIN code as input is correct, then during a step E17, the local authentication module 22 generates an SMS message, written SMS_5, in response to the local authentication request SMS_4. The message SMS_5 contains the transaction data (amount, date/time, and transaction identifier) and an indication "OK" indicating that local authentication has been successful. The message SMS_5 is encrypted, with the help of the key K1 in this example. It is possible to envisage encrypting it with the help of a symmetrical key K1' known to the card 2 and to the validation module 5, but different from K1. Instead of using symmetrical encryption, it would also be possible to use asymmetrical encryption or an authentication signature.

During a step E18, the authentication module 22 of the card 2 sends values "SW1 SW2" to the mobile terminal 1 acknowledging proper reception of the message SMS_5 by the card 2 and indicating that the local authentication module 22 seeks to send a command to the terminal 1 using a proactive command. During a step E19, the mobile terminal 1 transmits a "FETCH" command to the local authentication module 22 of the card 2 in order to obtain the command that is to be sent. In response, during a step E20, the local authentication module 22 of the card 2 sends a proactive "SEND SMS" command to the terminal 1 in order to send the SMS_5 containing the message in encrypted form.

During a step E21, the terminal 1 responds to the authentication module 22 with an "OK" acceptance message indicating that the terminal 1 accepts sending the message SMS_5. During a step E22, the authentication module 22 acknowledges the preceding exchange by transmitting appropriate values SW1 and SW2 to the terminal 1.

During a step E23, in response to the previously received message SMS_4, the terminal 1 transmits the message SMS_5 to the payment validation module 5, the message SMS_5 being transmitted over the mobile network and in encrypted form.

During a step E24, the validation module receives and decrypts the message SMS_5 (or the SMS message containing the "NOK" indication), verifies the result of the local authentication performed in the terminal 1 and the SIM card 2, and re-encrypts the transaction data (amount, date/time, and transaction identifier) using a secret key K2 shared between the validation module 5 and the merchant server 4.

During a step E25, the payment validation module 5 sends an http "302 found" code response, written RP_6, to the module terminal 1, which response contains a URL link for redirection to a page of the merchant server web site 4 together with the transaction data encrypted using the key K2. The http "302 found" response is a response to the http GET request (RQ_3) for obtaining transaction data as transmitted by the terminal 1 to the validation module 5 during step E4. This response RP_6 informs the web browser of the module terminal 1 that the web page requested from the validation module 5 in request RQ_3 has changed address and is accessible at a new address corresponding to the URL link present in the response RP_6, pointing to a page of the web site of the merchant server 4. In the event that local authentication has succeeded, this is a page containing a message indicating that the payment has been accepted. In the event that local authentication has failed, this is a page containing a message stating that payment has failed.

During a step E26, the mobile terminal 1 transmits an http GET request, written RQ_7, to the merchant server 4 for obtaining the web page specified in the response RP_6, by using the URL link present in that response. The request RQ_7 contains the transaction data encrypted using the key K2.

During a step E27, the merchant server 4 decrypts the transaction data present in the request RQ_7 using the secret key K2, and verifies the transaction identifier. If the transaction identifier corresponds to the identifier of the current transaction with the mobile terminal 1, then the merchant server 4 validates acceptance of the payment, and during a step E28 it transmits an http "200 OK" code response, written RP_8, to the mobile terminal 1, for it to display a message indicating that the payment has been accepted, e.g. "Congratulations. Your payment has been accepted".

During a step E29, on receiving the response RP_8, the terminal 1 displays the web page of the site of the merchant server 4 that contains the message indicating that the payment has been accepted, as shown in FIG. 3C.

Figure 2:
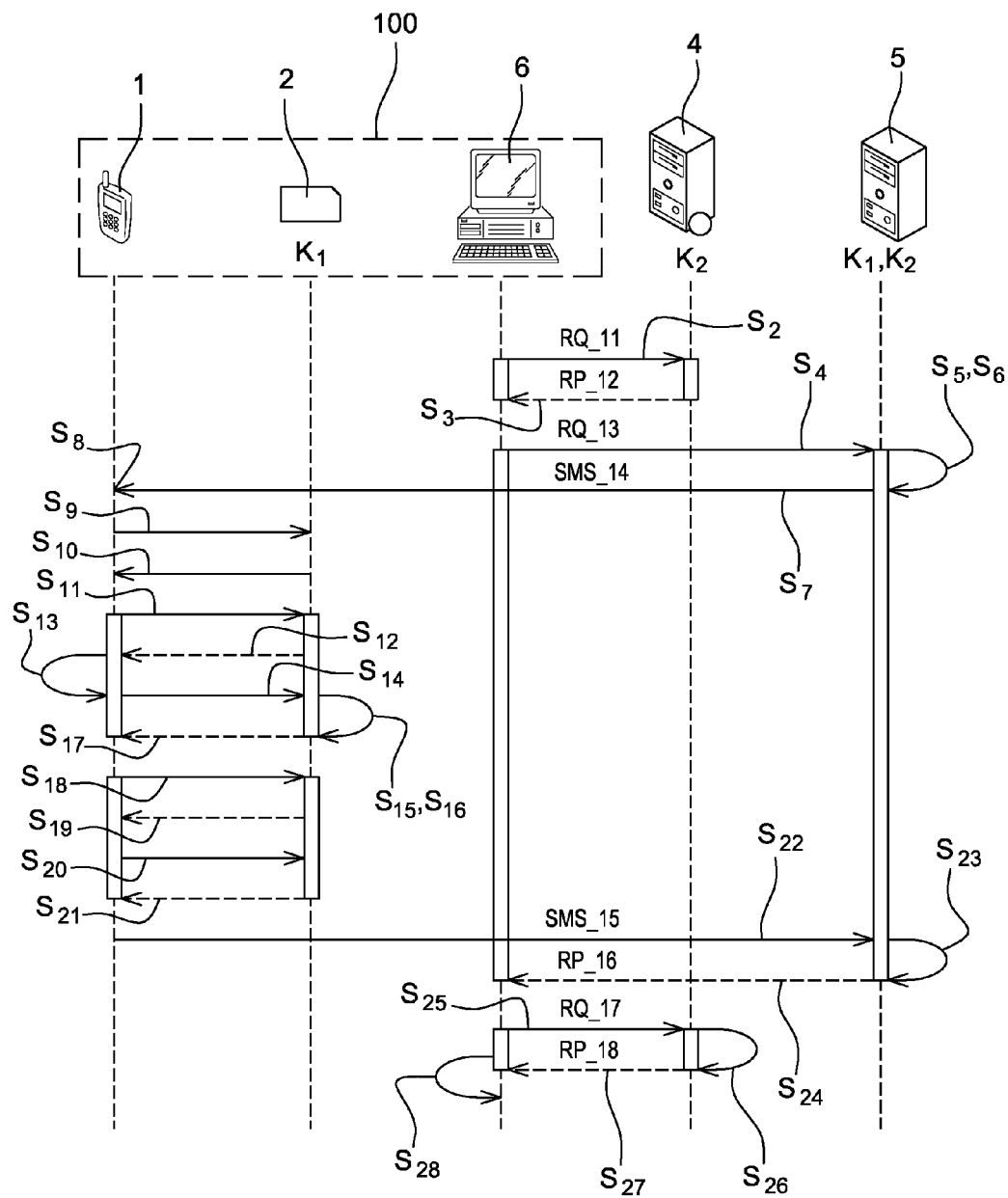
FIG. 2 shows the exchanges undertaken between the various entities of the system while implementing the method in a second particular implementation of the invention.

A second implementation of the payment method of the invention is described below with reference to FIG. 2. For reasons of clarity, corresponding elements in the first and second implementations are given the same references.

In this second implementation, the user device 100 comprises a browser terminal 6 and a mobile terminal 1 incorporating a security card 2.

The browser terminal 6 in this example is a computer that includes a web browser.

The mobile terminal 1 is analogous to the mobile terminal 1 described in association with the first implementation, with the difference that it need not incorporate a web browser.

The security card 2 is identical to that described in association with the first implementation.

During a prior registration step S0 (not shown), a user of the user device 100 registers payment bank details with the payment validation module 5, as explained above in association with the first implementation. During this registration S0, the secret key K1 shared between the SIM card 2 and the payment validation module 5 may be generated and stored by the card 2 and by the module 5.

During a step S1 (not shown), the browser terminal 6 browses to the web site of the merchant server 4 and prepares a shopping basket. While browsing the web site of the merchant server 4, the browser terminal 6 identifies itself with the merchant server 4. The merchant server 4 has a database storing user accounts containing personal user data and information about the orders the user has made with the merchant server 4. The user account of the device 100 contains in particular an identification alias associated with the mobile terminal 1, and on the basis of which the payment validation module 5 can determine the MSISDN identification number of the mobile terminal 1. As explained above, this identification alias is calculated on the basis of the MSISDN number.

During a step S2, the browser terminal 6 sends a request, specifically an http GET request, referenced RQ_11 in FIG. 1, to the merchant server 4 requesting a shopping basket and payment method selection page.

During a step S3, in response to the request RQ_11, the merchant server 4 transmits an http "200 OK" code response, referenced RP_12, containing the shopping basket web page requested in step S2. This shopping basket web page, shown in FIG. 3A, includes a link, specifically a URL link, associated with a method of payment by mobile terminal. The URL link points to the payment validation module 5 and contains as parameters of the URL the transaction data for paying for the shopping basket (amount, date/time, and transaction identifier), and the identification alias of the user.

During a step S4, on the user selecting a method of payment by mobile terminal and activating the corresponding URL link in the shopping basket page, the browser terminal 6 sends an http GET payment request, written RQ_13, to the payment validation module 5. The payment request RQ_13 contains the transaction data (amount, date/time, and transaction identifier) together with the identification alias it has received and it calls a script for managing validation of the payment. The identification alias is added to the request RQ_13 by the browser terminal 6 in automatic manner without the user inputting identification data.

In a step S5, the validation module 5 receives the request RQ_13 and determines the MSISDN number of the mobile terminal 1 from the identification alias present in the request RQ_13.

In a step S6, the validation module 5 generates a local authentication message request adapted to be transmitted over the mobile network. In this example, the authentication request message is an SMS command message, written SMS_14. It is sent to the local authentication module 22 hosted in the SIM card 2 of the mobile terminal 1, and it contains a local authentication request together with the payment transaction data (amount of the transaction, date/time of the transaction, and the transaction identifier as delivered by the merchant server 4). The message SMS_14 is encrypted, e.g. using a secret key K1 shared between the validation module 5 and the SIM card 2. The encryption of the request message is to enable the card 2 to verify that the local authentication request message SMS_14 does indeed come from the validation module 5. Instead of using encryption with a symmetrical secret key, it is possible to envisage using asymmetrical encryption, or an authentication signature. During a step S7, the validation module 5 sends the local authentication request message SMS_14 to the MSISDN number of the mobile terminal 1 using an SMS sender server of the mobile operator (not shown).

The following steps S8 to S23 performed by the mobile terminal 1 and the SIM card 2 are identical to the steps E9 to E24 described with reference to the first implementation.

During a step S24, the payment validation module 5 sends an http "302 found" code response, written RP_16, to the browser terminal 6, this response containing a redirection URL link pointing to a page of the web site of the merchant server 4 together with the transaction data encrypted using the key K2. The http "302 found" response is a response to the http GET request (RQ_13) for obtaining the transaction data as transmitted by the mobile terminal 1 to the validation module 5 during step S4. This response RP_16 informs the web browser of the mobile terminal 1 that the web page requested from the validation module 5 in the request RQ_13 has changed address and is accessible at a new address corresponding to the URL link present in the response RP_16 and pointing to a page of the web site of the merchant web server 4.

During a step S25, the navigation terminal 6 transmits an http GET request, written RQ_17, to the merchant server 4 in order to obtain the web page specified in the response RP_16, by using the URL link present in that response. The request RQ_17 contains the transaction data encrypted using the key K2.

During a step S26, the merchant server 4 decrypts the transaction data present in the request RQ_17 by using the secret key K2, and it verifies the transaction identifier. If the transaction identifier corresponds to the identifier of the current transaction with the mobile terminal 1, then the merchant server 4 validates the acceptance of the payment and, during a step S27, transmits an http "200 OK" http response, written RP_18, to the mobile terminal 1 for causing it to display a message indicating that the payment has been accepted, e.g. "Congratulations. Your payment has been accepted".

During a step S28, on receiving the response RP_18, the terminal 6 displays the web page of the site of the merchant server 4 that contains the message indicating that the payment has been accepted, as shown in FIG. 3C.

The invention also provides the system for remote payment of a shopping basket that comprises:
the user device 100 suitable for being connected to a mobile telephony network and associated with an identification number in said mobile telephony network, and suitable for navigating pages of the merchant server;
the merchant server 4; and
the payment validation module 5.

In the first implementation, the user device 100 comprises the mobile terminal 1 and the security card 2, and the system comprises the enrichment platform 3 of the mobile network.

In the second implementation, the user device 100 comprises the mobile terminal 1, the security card 2, and the browser terminal 6.

The various entities in the system are adapted to implement the steps of the above-described method.

In the above description, the keys K1 and K2 used for encrypting certain exchanges between the payment validation module 5 and firstly the SIM card 2 and secondly the merchant server 4 are symmetrical encryption/decryption keys. In alternative manner, it would be possible to use a pair of asymmetrical keys for encrypting and decrypting the exchanges, or it would be possible to add authentication signatures to the exchanges.

The invention claimed is:
1. A method comprising:
using a user device for remote payment of a shopping basket on a merchant server, said user device being configured to connect to a mobile telephony network and being associated with an identification number in said mobile telephony network, wherein:
a) the user device selects a method of paying for the shopping basket on a first page of the merchant server in a payment transaction;
b) on the method of payment being selected, the user device sends a payment request to a payment validation module, said request being automatically enriched with identification data of the user device from which the payment validation module determines the identification number of said user device in the mobile telephony network;
c) the user device receives a local authentication request message from the payment validation module that is sent over the mobile telephony network to the identification number of the device in the mobile telephony network;
d) on receiving the local authentication request message, the user device automatically triggers execution of an operation of locally authenticating a user of the user device, wherein the user device comprises a security module, which includes a processor and stores a code, for unblocking the security module and enabling connection to the mobile telephony network, and a service code, and wherein the local authentication operation comprises:
the security module triggering a display of a window on a display screen of the user device enabling the user to input the service code, the window also containing transaction data relating to the payment transaction;
the security module receiving said service code input from the user in the displayed window through the user device, and
the security module verifying the service code as input by the user with the service code stored by the security module, and if the service code is valid, the security module generating a local authentication response message comprising an indication that authentication has succeeded and transaction data relating to the payment transaction, said response message being encrypted by the security module for the attention of the payment validation module;
e) the user device sends the local authentication response message to the payment validation module; and
f) in response to said payment request, the user device receiving a link from the payment validation module that redirects the user device to a second page of the merchant server giving a result of the payment transaction.

2. The method according to claim 1, wherein said identification data of the user device is added to the payment request sent by the user device by using an entity in the mobile telephony network.

3. The method according to claim 2, wherein the user device comprises a mobile terminal and the security module is associated with said mobile terminal, and wherein said mobile terminal and said security module perform steps a) to f).

4. The method according to claim 1, wherein the identification data of the user device is provided by the merchant server together with the first page and is then automatically inserted by the user device in the payment request that is sent to the payment validation module.

5. The method according to claim 4, wherein the user device comprises a first terminal, which is a browser terminal, a second terminal, which is a mobile terminal, and the security module is associated with the mobile terminal, the browser terminal performing steps a), b), and f), and the mobile terminal with the associated security module performing the steps c), d), and e).

6. The method according to claim 1, wherein, on the payment request requesting a page for displaying payment transaction data during step f), the user device receives from the payment validation module a response to said payment request indicating that the requested page has changed address and is accessible from the merchant server.

7. The method according to claim 3, wherein the identification data of the user device comprises an identification number of the mobile terminal in the mobile telephony network.

8. The method according to claim 3, wherein the identification data of the user device comprises an identification alias known to the merchant server and to the payment validation module.

9. A system for remote payment of a shopping basket, the system comprising:
- a user device configured to connect to a mobile telephony network and associated with an identification number in said mobile telephony network, the user device comprising a display screen and a security module, which includes a processor and stores:
  - a code for unblocking the security module and enabling connection to the mobile telephony network; and
  - a service code;
- a merchant server; and
- a payment validation module;

wherein the user device is configured to:
a) select a method of paying for the shopping basket on a first page of the merchant server in a payment transaction;
b) on the method of payment being selected, send a payment request to a payment validation module, said request being automatically enriched with identification data of the user device from which it is possible to determine the identification number of said user device in the mobile telephony network;
c) receiving a local authentication request message from the payment validation module that is sent over the mobile telephony network to the identification number of the device in the mobile telephony network;
d) on receiving the local authentication request message, automatically triggering execution of an operation of locally authenticating a user of the user device, wherein the local authentication operation comprises:

the security module triggering a display of a window on the display screen of the user device enabling the user to input the service code, the window also containing transaction data relating to the payment transaction;

the security module receiving said service code input from the user in the displayed window through the user device, and the security module verifying the service code as input by the user with the service code stored by the security module, and if the service code is valid, the security module generating a local authentication response message comprising an indication that authentication has succeeded and transaction data relating to the payment transaction, said response message being encrypted by the security module for the attention of the payment validation module;

e) sending the local authentication response message to the payment validation module, the payment validation module being configured to decrypt the local authentication response message; and f) in response to said payment request, receive a link from the payment validation module that redirects the user device to a second page of the merchant server giving a result of the payment transaction, wherein the payment validation module is configured to determine the identification number of said user device in the mobile telephony network from received identification data of the user device.

10. The method according to claim 5, wherein the identification data of the user device comprises an identification number of the mobile terminal in the mobile telephony network.

11. The method according to claim 5, wherein the identification data of the user device comprises an identification alias known to the merchant server and to the payment validation module.

* * * * *